United States Patent
Hirota et al.

(10) Patent No.: US 6,334,335 B1
(45) Date of Patent: *Jan. 1, 2002

(54) METHOD OF MANUFACTURING A GLASS OPTICAL ELEMENT

(75) Inventors: Shin-Ichiro Hirota; Jun Ichnose, both of Tokyo; Hiroshi Enomoto, Kanagawa, all of (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,689

(22) Filed: Apr. 30, 1997

(51) Int. Cl.$^7$ .............................................. C03B 11/12
(52) U.S. Cl. ............................ 65/66; 65/102; 65/182.2; 65/355
(58) Field of Search ........................... 65/66, 102, 103, 65/26, 29.19, 29.21, 182.2, 355, 356, 374.15

(56) References Cited

U.S. PATENT DOCUMENTS

| | | | | |
|---|---|---|---|---|
| 1,638,593 A | * | 8/1927 | Mulholland | 65/25.1 |
| 2,911,669 A | * | 11/1959 | Beckwith | 264/15 |
| 3,833,347 A | * | 9/1974 | Angle et al. | 65/32.5 |
| 3,961,927 A | * | 6/1976 | Alderson et al. | 65/25.1 |
| 4,734,118 A | * | 3/1988 | Marechal et al. | 65/102 |
| 5,192,353 A | * | 3/1993 | Trentelman | 65/66 |
| 5,228,894 A | * | 7/1993 | Sato et al. | 65/102 |
| 5,282,878 A | * | 2/1994 | Komiyama et al. | 65/162 |
| 5,346,523 A | * | 9/1994 | Sugai et al. | 65/102 |
| 5,380,349 A | * | 1/1995 | Taniguchi et al. | 65/286 |

FOREIGN PATENT DOCUMENTS

| | | | |
|---|---|---|---|
| JP | 59-203732 | * | 11/1984 |
| JP | 62-27334 | * | 2/1987 |
| JP | 63-45134 | | 2/1988 |
| JP | 2-59449 | * | 2/1990 |
| JP | 5-70154 | * | 3/1993 |
| JP | 7-10556 | * | 1/1995 |

OTHER PUBLICATIONS

Database WPIDS, week 9728, Derwent Publications, AN 97–306493, Class L01, JP 9–118530 A (HOYA), abstract, Oct. 1995.*

* cited by examiner

*Primary Examiner*—Sean Vincent
(74) *Attorney, Agent, or Firm*—Sughrue Mion, PLLC

(57) ABSTRACT

A method for forming a glass optical element by press forming a thermally softened glass material with a preheated forming mold composed of an upper and a lower die. The glass material, the upper die and the lower die are heated within respectively prescribed temperature ranges, the preheating temperature of the upper die being below the preheating temperature of the lower die. The thermally softened glass material is pressed in the preheated forming mold, and the forming surfaces of the upper and the lower dies are cooled simultaneously with the start of the initial pressing, during the process of the initial pressing, or after the completion of the initial pressing.

16 Claims, 9 Drawing Sheets

METHOD OF MANUFACTURING A GLASS OPTICAL ELEMENT

BACKGROUND OF THE INVENTION

This invention relates to a method of manufacturing a glass optical element, such as a glass lens, by pressing without necessity of a grinding or a polishing process after pressing. More particularly, this invention relates to a forming method which can manufacture a glass optical element with high optical quality, with high productivity, and with a short cycle, time.

Heretofore, various methods have been proposed which manufacture a glass optical element only by pressing or press forming a glass preform of a raw glass material within a forming mold. In this event, the forming mold should have high surface accuracy and smooth surface roughness to obtain a final glass optical element.

Coventionally, disclosure is made in U.S. Pat. No. 3,833,347 (the first reference 1) about a method which is called an isothermal pressing method and which comprises the steps of preliminarily disposing a glass material in a forming mold, heating the glass material together with the mold to put both the glass material and the mold into an isothermal state and to thereby soften the glass material, and press forming the glass material under a pressure in the isothermal state. Thereafter, the glass material pressed is cooled to a temperature lower than the glass transition point thereof with the pressure kept intact.

This isothermal press method does not cause any sink mark to occur in the glass optical element and serves to form precise surfaces on the glass optical element with the isothermal state kept during the press forming between the glass material and the forming mold. This shows that the glass material is kept at a temperature substantially equal to that of the forming surfaces.

This method, however, is very low in productivity because it takes a very long time to raise up the temperature before the press forming step and to cool the glass optical element after the press forming process. This shows that a cycle time of the whole process necessary for manufacturing the glass optical element becomes long. Accordingly, the glass material is contacted with the forming surfaces of the forming mold for a long time. Such a long time contact between the softened glass material and the mold surfaces causes reaction to occur between the glass material and the mold surfaces and is liable to bring about fusion and opacfication onto the glass material. Moreover, this results in shortening a life time of the forming mold.

In order to overcome these disadvantages, consideration has been made about a non-isothermal press method. In this method, a glass preform previously softened is introduced into a forming mold which is kept at a relatively low temperature. Specifically, JP-A-59-203,732 (the second reference 2) discloses a non-isothermal press method which comprises the steps of softening a glass material to a temperature which corresponds to a viscosity in the range of $10^{5.5}$–$10^7$ poises and press forming the softened glass material by the use of a forming mold kept at a temperature which is lower than the temperature of the glass material by 100° C., namely, lower than the transition point of the glass by about 20° C. In this method, the glass material is softened and conveyed or transported with the glass material held in a holder. However, the glass material is too soft and is therefore often deformed while it is being held in the holder and being transported and/or adhered to the holder.

Furthermore, JP-A-62-27,334 (the third reference 3) discloses a method which comprises the steps of heating a glass material to a temperature which corresponds to the viscosity between $10_6$ and $10^8$ poises and which is comparatively low in comparison with the second reference 2. On the other hand, a forming mold is kept at a temperature between a transformation temperature (Tg) and (Tg-200° C.). Under the circumstances, the press forming is carried out by the use of the forming mold heated above. This method, however, is disadvantageous in that sink mark and wrinkles objectionably take place on the glass optical element. This is because the temperature of the forming mold is very low and, as a result, the glass material is quickly cooled within the forming mold during the press forming process. Therefore, a desirable surface accuracy of the glass optical element can not be accomplished with this method. Moreover, when a thin-lens is manufactured which has a predetermined thickness, it is difficult to press the glass material to the predetermined thickness because the glass material is not kept at a comparatively hard state within the glass mold and can not be therefore pressed to the predetermined thickness.

In order to avoid the defects and the disadvantages of the above-mentioned references, typical temperature conditions are disclosed in JP-A-07-10,556 (the fourth reference). In the fourth reference 4, a glass material is heated to a temperature which corresponds to the viscosity thereof between $10^7$ and $10^9$ poises and is introduced into a mold which is preheated to a temperature corresponding to the viscosity of the glass material between $10^{10}$ and $10^{12}$ poises. Thereafter, the glass material is pressed within the forming mold and then cooled together with the forming mold to a temperature corresponding to $10^{13}$ poises. Subsequently, the pressure is relieved from the forming mold.

This method, however, brings about adhesion of the pressed glass material to an upper or a lower die of the forming mold, although the pressed glass material is not fused onto the forming mold on releasing the pressed glass material from the forming mold. Accordingly, this method must be practically cooled to a very low temperature prior to separation or release of the forming mold. This results in lengthening a cycle time for manufacturing the pressed glass material.

Incidentally, JP-A-02-59,449 (the fifth reference 5) discloses a method which prevent a shaped glass article from being adhered to a forming mold. With this method, the forming mold is opened or separated into an upper die and a lower die which are kept at different temperatures. Therefore, a pressed glass material is taken out from the forming mold after the pressed glass material is cooled to the temperature of the forming mold mentioned above.

More specifically, the upper and the lower dies are at first kept at the same temperature while a glass material is also preheated so that it has a viscosity enough for press forming. Subsequently, the glass material is introduced within the upper and the lower dies and is pressed under a pressure. Thereafter, the upper and the lower dies are gradually cooled together and the lower die alone is further cooled by blowing a cooling gas onto the lower die. The temperature of the resultant lower die is lower than that of the upper die. Thus, a temperature difference is caused to occur between the upper and the lower dies. Under the circumstances, the upper and the lower dies are opened or separated from each other to take out the pressed glass material.

This method is however disadvantageous in that cracks or the like are liable to be caused to occur in the pressed glass material and a cycle time becomes long. In addition, a desirable surface accuracy can not be accomplished by this method.

In JP-A-05-70,154 (the sixth reference 6) also, a temperature difference is given to upper and lower dies on separating the upper and the lower dies. Specifically, pressed glass material is released from one of the dies kept at a low temperature and is thereafter released from the other die kept at a high temperature. However, the pressed glass material is often adhered to the other die kept at the high temperature even when it is released from the one die. Therefore, a specific tool must be prepared so as to release the pressed glass material from both of the dies. In addition, when the pressed glass material is adhered to the upper die, it might be dropped and broken in the course of separation or release.

SUMMARY OF THE INVENTION

In the previous Japanese patent application No.

Hei 7-259015, the present inventors have already proposed a method of manufacturing a pressed glass element. More particularly, the method comprises the steps of press forming a thermally softened glass material, such as a glass preform. To this end, the glass material is heated prior to the press forming to a temperature which falls within a specific range while the forming mold is also heated to a temperature which falls within a particular range. In this situation, the glass material is pressed by the forming mold within the specific range and is released form the forming mold after the forming mold becomes a temperature lower than the specific range. With this method, it is possible to manufacture the pressed glass element of an excellent property within a short cycle time. In addition, the pressed glass element has a good surface accuracy.

However, transient adhesion of the pressed glass element to the upper die takes place sometimes on separating the forming mold into the upper and the lower dies. Therefore, there is a problem that separating the upper and the lower dies is unstable. Such unstable separation of the forming mold makes it difficult to shorten a cycle time on successively mass-producing the glass optical elements.

It is, therefore, an object of this invention to provide a method which is capable of successively manufacturing a great number of glass optical elements, such as lenses, by press forming a thermally softened glass material, such as glass preform.

It is another object of this invention to provide a method of the type described, which is suitable for mass-producing the glass optical elements.

It is still another object of this invention to provide a method of the type described, which is capable of avoiding adhesion of the glass optical element to a forming mold.

It is yet another object of this invention to provide a method of the type described, which is capable of shortening a cycle time necessary for manufacturing the glass optical element.

It is another object of this invention to provide a method of the type described, which is capable of manufacturing the glass optical element having an excellent surface accuracy without any sink mark, deformation, and the like.

It is a further object of this invention to provide a method of the type described, which is capable of precisely manufacturing a glass optical lens with a thin-thickness at an edge portion.

According to the inventors'experimental studies, it has been found out that the problems of the references mentioned above can be solved by preheating upper and lower dies of a forming mold to a first predetermined temperature and a second predetermined temperature higher than the first predetermined temperature and by pressing a glass material softened and kept at a third predetermined temperature higher than the second predetermined temperature.

According to this invention, there is provided a method for forming a glass optical element by press forming a thermally softened glass material with a preheated forming mold composed of an upper and a lower die, characterized by setting the temperature for heating the glass material at a level equivalent to less than $10^9$ poises of the viscosity of the glass material, setting the temperature for preheating the upper die at a level equivalent to $10^{9.5}-10^{12}$ poises of the viscosity of the glass material, setting the temperature for preheating the lower die at a level equivalent to $10^9-10^{11.5}$ poises of the viscosity of the glass material, and further keeping the preheating temperature of the upper die below the preheating temperature of the lower die, subjecting the thermally softened glass material to initial pressing in the preheated forming mold under a pressure in the range of 20–350 kg/cm$^2$ for a period in the range of 1–30 seconds, cooling the neighborhood of the forming surfaces of the upper and the lower dies at a speed of 20–180° C., simultaneously with the start of the initial pressing, during the process of the initial pressing, or after the completion of the initial pressing, relieving the forming mold of the pressure after the temperatures in the neighborhood of the forming surfaces of the upper and the lower dies have fallen below a level equivalent to $10^{12.5}$ poises of the viscosity of the glass material, and releasing a shaped article of glass from the forming mold.

According to this invention, there is also provided a method of forming a glass optical element by pressing a thermally softened glass material by the use of a preheated forming mold composed of an upper and a lower die, the method comprising the steps of heating a glass material at a temperature which corresponds to less than $10^9$ poises in the viscosity of the glass material, to form the thermally softened glass material; preheating the upper die at a first temperature which corresponds to $10^{9.5}-10^{12}$ poises in the viscosity of the glass material; preheating the lower die at a second temperature which corresponds to $10^9-10^{11.5}$ poises in the viscosity of the glass material and which is higher than the first temperature; subjecting the thermally softened glass material to initial pressing within the preheated upper and lower dies under a pressure between 20 and 350 kg/cm$^2$ for a period between 1 and 30 seconds; cooling the upper and the lower dies so that portions adjacent to forming surfaces of the upper and the lower dies are cooled at a speed of 20–180° C., simultaneously with the start of the initial pressing, during the process of the initial pressing, or after the completion of the initial pressing; relieving the forming mold of the pressure after the temperatures in the portions adjacent to the forming surfaces of the upper and the lower dies have fallen below a temperature corresponding to $10^{12.5}$ poises in the viscosity of the glass material; and releasing a shaped article of glass as the glass optical element from the forming mold.

DETAILED DESCRIPTION OF THE INVENTION

Figure 1:
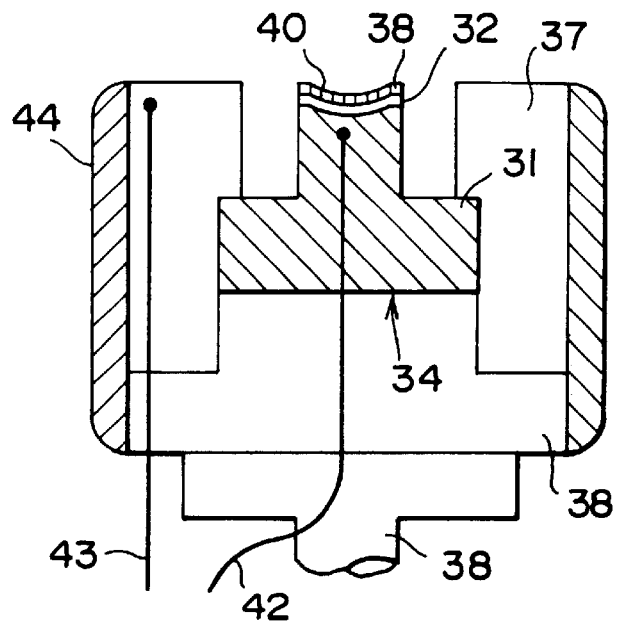
FIG. 1 is a schematic view of a lower die of a forming mold used in this invention.

This invention is directed to a method for forming a glass optical element by press forming a thermally softened glass material with a preheated forming mold composed of an upper and a lower die. This invention is featured by setting the temperature of the glass material at a level equivalent to less than $10^9$ poises of the viscosity of the glass material, setting the temperature for preheating the upper die at a level equivalent to $10^{9.5}$–$10^{12}$ poises of the viscosity of the glass material, setting the temperature for preheating the lower die at a level equivalent to $10^9$–$10^{11.5}$ poises of the viscosity of the glass material, and further keeping the preheating temperature of the upper die below the preheating temperature of the lower die, subjecting the thermally softened glass material to initial pressing in the preheated forming mold under a pressure in the range of 20–350 kg/cm² for a period in the range of 1–30 seconds, cooling the neighborhood of the forming surfaces of the upper and the lower dies at a speed of 20–180° C. simultaneously with the start of the initial pressing, during the process of the initial pressing, or after the completion of the initial pressing, relieving the forming mold of the pressure after the temperature in the neighborhood of the forming surfaces of the upper and the lower dies has fallen below a level equivalent to $10^{12.5}$ poises of the viscosity of the glass material, and releasing a shaped article of glass from the forming mold.

Now, this invention will be described below.

This invention concerns a method for producing a glass optical element by press forming a thermally softened glass material for forming with a forming mold having the upper die thereof preheated to a lower temperature than the lower die thereof. The kind, shape, etc. of the glass which forms the glass material have been heretofore known to the art. The glass material can be a glass preform or a glass gob, for example. The term "glass preform" refers to a shaped article formed in a stated shape and used as a precursor in the formation of a glass optical element. The glass preform can be obtained by cold working or by hot forming molten glass and can be further given mirror polish. It can have a coarse surface instead of a specular surface. A ground article of glass obtained by the use of diamond #800, for example, can be used as a glass preform.

The shape of the glass preform is decided in consideration of the size and volume of a glass optical element as a finished product, the amount of change during the process of forming, and the like. Further, for the sake of precluding the occurrence of gas trap during the course of forming, the shaped article properly has a shape such that the center thereof first contacts the surface of the preform to be formed. The shape of the glass preform can be spheres, marbles, discs, or globes, for example.

The term "glass gob" refers to glass pieces of a prescribed volume obtained by separating molten glass. Generally, the glass gobs have an irregular shape full of wrinkles.

The volume of a preform or a gob is slightly larger than the volume of a finished product. The final outside diameter thereof can be determined by a centering work to be formed subsequently to the step of forming.

By the forming method of this invention, the glass material is softened by being heated to a temperature equivalent to less than $10^9$ poises of the viscosity thereof. Since the viscosity of the glass material is less than $10^9$ poises, the glass material can be thoroughly deformed for the sake of formation by the use of a forming mold preheated to a temperature equivalent to not less than $10^9$ poises of the viscosity. For the purpose of using the forming mold at a relatively low temperature in the formation, it is proper to have the glass material softened by being heated to a temperature equivalent to $10^{5.5}$–$10^{7.6}$ poises.

The preheating temperature of the upper die of the forming mold is equivalent to $10^{9.5}$ to $10^{12}$ poises of the viscosity of the glass material mentioned above, the preheating temperature of the lower die equivalent to $10^9$–$10^{11.5}$ poises of the viscosity of the glass material, and the preheating temperature of the upper die is lower than the preheating temperature of the lower die.

If the preheating temperature of the upper die is less than a level equivalent to $10^{12}$ poises of the viscosity of the glass material, it will be difficult to obtain a shaped article of glass of a thin thickness at an edge or secure high surface accuracy for the shaped article. This disadvantage will likewise ensue if the preheating temperature of the lower die is less than a level equivalent to $10^{11.5}$ poises of the viscosity of the glass material.

If the preheating temperature of the lower die of the forming mold exceeds a level equivalent to $10^9$ poises of the viscosity of the glass material, the cycle time for the formation will be unduly long and the service life of the forming mold will be unduly short. This disadvantage will likewise ensue if the preheating temperature of the upper die exceeds a level equivalent to $10^{9.5}$ poises of the viscosity of the glass material. Further, by producing a temperature difference between the upper and the lower dies of the forming mold, the difference in fastness of adhesion of the glass material to the forming mold during the course of pressing can be utilized for exalting the ease of separation of the shaped glass from the forming mold after cooling. The upper die of the forming mold has a lower preheating temperature than the lower die thereof. If the preheating temperature of the upper die is higher than the preheating temperature of the lower die, the glass material will possibly adhere fast to the upper die and accidentally falldown in the course of subsequent handling. From the point of view of acquiring perfect surface accuracy and ensuring high ease of separation of the shaped glass from the forming mold, the difference in temperature between the upper die and the lower die at the outset of the initial pressing is properly in the range of 5–35° C. For the formation contemplated by this invention, the forming mold heretofore well known to the art can be used in its unmodified form. It is provided, however, that the forming mold appropriately has a forming surface made of a carbon film of a unicomponent layer or a mixed layer of an amorphous and/or crystalline graphite structure and/or diamond structure. The forming mold which has a forming surface made of such a carbon film as described above cannot induce fusion of glass even when the temperature thereof falls in the range ($10^9$–$10^{12}$ poises) of this invention which surpasses the glass transition point of the glass material.

The carbon film mentioned above is formed by such means as the sputtering method, plasma CVD method, CVD method, or ion plating method. The formation of this film by the sputtering method is appropriately implemented by sputtering such an inert gas as Ar against graphite as a target, with the substrate temperature in the range of 250–600° C., the RF power density in the range of 5–15 W/cm$^2$, and the vacuum degree during the course of sputtering in the range of $5\times10^{-4}$–$5\times10^{-1}$ torr.

The formation of the film by the microwave plasma CVD method is appropriately carried out by using methane gas and hydrogen gas as raw material gases, with the substrate temperature in the range of 650–1000° C., the microwave power in the range of 200W-1 kW, and the gas pressure in the range of $10^{-2}$–600 torrs.

The formation of the film by the ion plating method is properly performed by ionizing benzene gas, with the substrate temperature in the range of 200–450° C.

The carbon films formed as described above may or may not possess a C—H bond in the chemical structure thereof.

In the forming method of this invention, the thermally softened glass material mentioned above is subjected to initial pressing in the aforementioned preheated forming mold for a period in the range of 1–30 seconds. If the period of this initial pressing is less than 1 second, the glass material will not be expanded fully satisfactorily and will consequently fail to produce a glass optical element of an expected shape. The surface accuracy of the produced shaped article of glass augments in proportion as the period of the initial pressing elongates. If the period is unduly long, however, the cycle time will not be shortened as expected and the service life of the forming mold will suffer an adverse effect of the pressing. Hence, the period has 30 seconds as the upper limit thereof.

The forming pressure can be properly decided with due respect to such factors as the temperature of the glass material and the temperature of the forming mold. Generally, it is proper to select this forming pressure in the range of 20–350 kg/cm$^2$. If the forming pressure is less than 20 kg/cm$^2$, the inconvenience of inevitably adding to the temperature or to the time will ensue because the glass material will not be easily elongated. In contrast, if the forming pressure exceeds 350 kg/cm$^2$, the disadvantage of the shaped article of glass sustaining residual strain will arise.

The neighborhood of the forming surfaces of the forming mold is cooled at a speed of 20–180° C. simultaneously with the start of the initial pressing, during the process of the initial pressing, or after the completion of the initial pressing. Though the cooling speed may be lowered below the lower limit, 20° C. /minute, this decrease only brings about elongation of the cycle time of the formation. If the cooling speed exceeds 180° C. /minute, the problem of impairing the surface accuracy will arise because the excess of the cooling speed widens the temperature difference between the surface and the interior of the glass. From the viewpoint of obtaining high surface accuracy, it is proper to cool the neighborhood of the forming surface at a speed in the range of 20–180° C., though this range is variable with the size and shape of the shaped article of glass.

From the viewpoint of preventing the product from sustaining shrinkage cavity or deformed contour and enabling the product to acquire perfect surface accuracy and a central wall thickness falling in the range of manufacturing tolerance, it is proper to perform secondary pressing subsequently to the initial pressing under a pressure of 5–70% of the pressure used for the initial pressing and continue to cool the neighborhood of the forming surface under the pressure of the secondary pressing. The pressure for the secondary pressing is preferably in the range of 20–50% of the pressure of the initial pressing.

Further, from the viewpoint of allowing the final product to acquire a central wall thickness in the range of manufacturing tolerance, it is proper to perform the initial pressing in such a manner that the central wall thickness of the thermally softened glass material may fall in the range between 0.03 mm smaller and 0.15 mm larger than the central wall thickness of the finished product and subsequently perform the secondary pressing. In the secondary pressing, the deformation of the glass to be caused at all by the pressing is barely on the order of 0.001–0.12 mm in terms of the central wall thickness because the pressure is instantaneously decreased and the glass has acquired high viscosity. Thus, the final central wall thickness can be easily confined in the range of tolerance 0.03 mm.

The initial pressing and the secondary pressing described above prove advantageous from the viewpoint of enabling the final product to attain the central wall thickness contemplated by this invention because the initial pressing of the thermally softened glass material is stopped by such means as discontinues the application of pressure to produce an expected central wall thickness falling in the range between 0.03 mm smaller and 0.15 mm larger than the central wall thickness of the finished product and the secondary pressing is initiated either prior to or simultaneously with the stop of the initial pressing and also refraining from impairing the surface accuracy because the application of pressure continues between the initial pressing and the secondary pressing. When the initial pressing is stopped by the use of an external mechanism so as to acquire the expected central wall thickness and it is then followed by the secondary pressing, the product is liable to acquire perfect surface accuracy with difficulty because the application of pressure is interrupted, though momentarily. It is proper to carry out the initial pressing and the secondary pressing by the use of a double-wall cylinder mechanism. The double-wall cylinder mechanism will be described more specifically in one of the working examples cited herein below.

The cooling mentioned above is properly effected by supplying a gas into a forming chamber having the forming mold disposed therein and forcibly cooling the atmosphere of the whole forming chamber without directly blowing the gas against the shaped article of glass and the neighborhood of the forming surface of the forming mold. The cooling thus effected brings the advantage that the cooling can be carried out without impairing the temperature difference between the upper and the lower dies of the forming mold, stabilizing the efficiency of mold release, and markedly shortening the cycle time necessary for press forming. This method of cooling allows retention of surface accuracy and acquisition of perfect efficiency of mold release, whereas the direct blowing of the cooling gas against the shaped article of glass and the neighborhood of the forming surface of the forming mold renders difficult the acquisition of surface accuracy.

The gas to be supplied into the forming chamber has no particular restriction imposed thereon. It is properly selected from among such non-oxidizing gases as, for example, helium, nitrogen, or argon. This gas optionally contains hydrogen.

The shaped article of glass which has been press formed and then cooled as described above is relieved of the pressure and released from the forming mold after the temperatures in the neighborhood of the forming surfaces of the upper and the lower dies have fallen below a level equivalent to $10^{12.5}$ poises, preferably $10^{13}$–$10^{15.5}$ poises, of the viscosity of the glass material. The glass in the shaped article does not quickly induce viscous flow and can be safely regarded as substantially solidified when the temperature thereof is below a level equivalent to $10^{12.5}$ poises of the viscosity of glass. As a result, the shaped article of glass after the release from the forming mold produces no deformation but acquires perfect surface accuracy. Preferably, the shaped article of glass released from the forming mold is subjected to simplified annealing or precision annealing.

The forming mold to be used for the method of formation in this invention has no particular restriction to impose except on the forming surface thereof. A resistance heater, a high frequency heater, an infrared lamp heater, etc. can be used for heating the forming mold. Particularly, from the viewpoint of enabling the forming mold to attain quick restoration of the forming temperature, it is proper to use a high frequency heater or an infrared lamp heater. Properly, the forming mold is cooled by the spontaneous radiation of heat which is induced by blocking power supply. To expedite this cooling, it is proper to supply the cooling gas into the forming chamber and effect forced cooling of the atmosphere of the whole forming chamber. The cooling may be optionally implemented by means of the cooling gas circulated within the forming chamber under such conditions as are incapable of impairing the surface accuracy.

Figure 5:
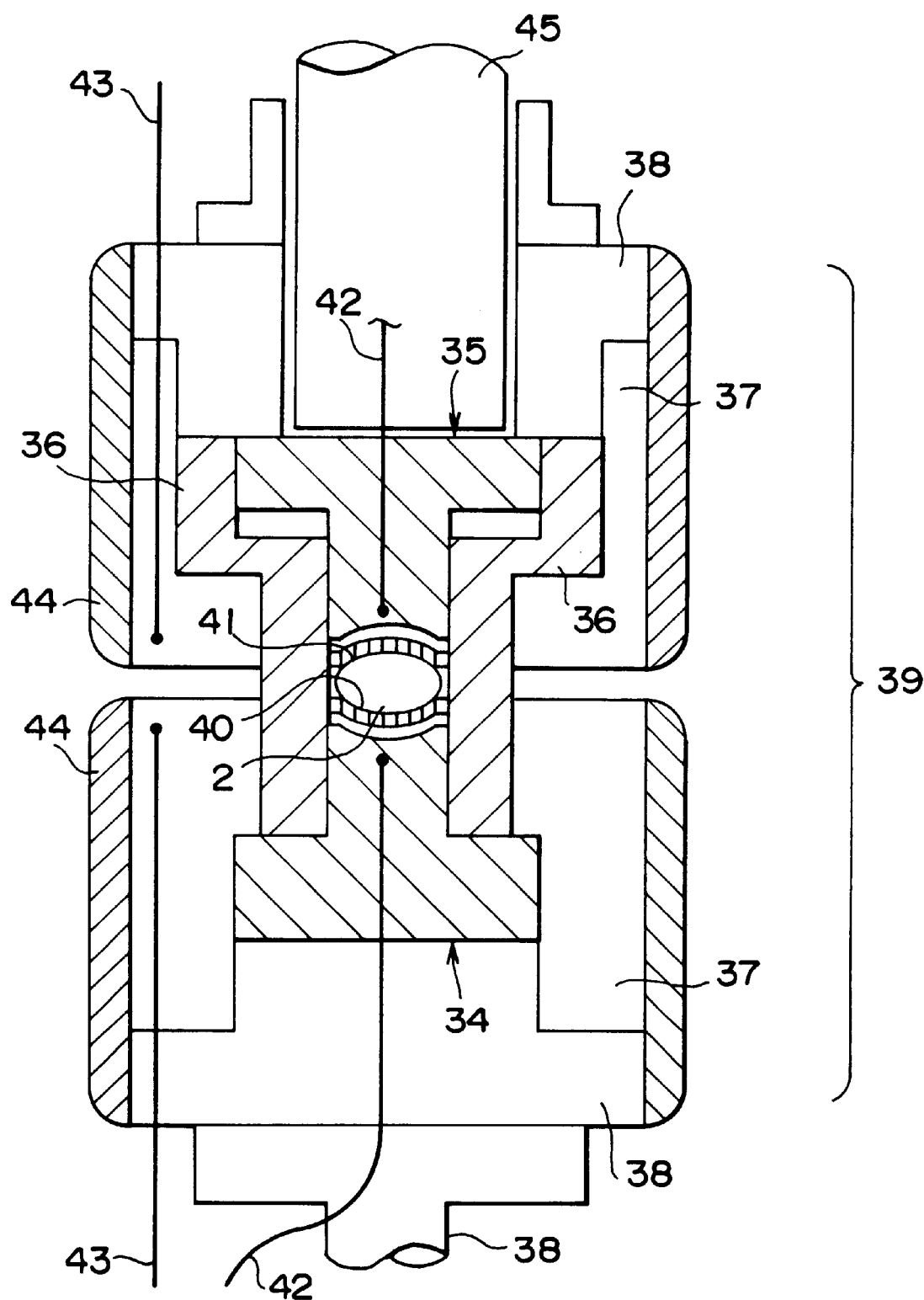
FIG. 5 is a schematic view for describing a process of press forming a glass material by the use of a forming mold operated in accordance with this invention.

A forming mold 39 which is composed of an upper die 35, a lower die 34, and a guide frame 36 as illustrated in FIG. 5, for example, may be used as the forming mold in this invention. The forming mold, however, does not need to be limited to this particular construction. The forming mold which is made of a cermet having silicon carbide, silicon, silicon nitride, tungsten carbide, aluminum oxide, or titanium carbide as a main component thereof and further coated with diamond, a heat-resistant metal, a noble metal alloy, or a ceramic substance such as carbide, nitride, boride, or oxide can be used herein. Particularly, it is proper to use what is obtained by coating a sintered substrate of silicon carbide with a silicon carbide film by the CVD method, working the coated substrate in a finished shape, and then depositing thereon as by the ion plating method a carbon film of a unicomponent layer or a mixed layer of an amorphous and/or crystalline graphite structure and/or diamond structure. The forming mold so produced is preferred because this forming mold, even when heated to a relatively high temperature, avoids inducing fusion of the glass material being formed therein and because it allows easy release of the shaped article of glass at a relatively high temperature owing to the high efficiency of mold release. The forming mold so fabricated that the radius of curvature of the forming surface of the upper die thereof is smaller than the radius of curvature of the forming surface of the lower die is advantageously used herein because it offers perfect efficiency of mold release.

Figure 9:
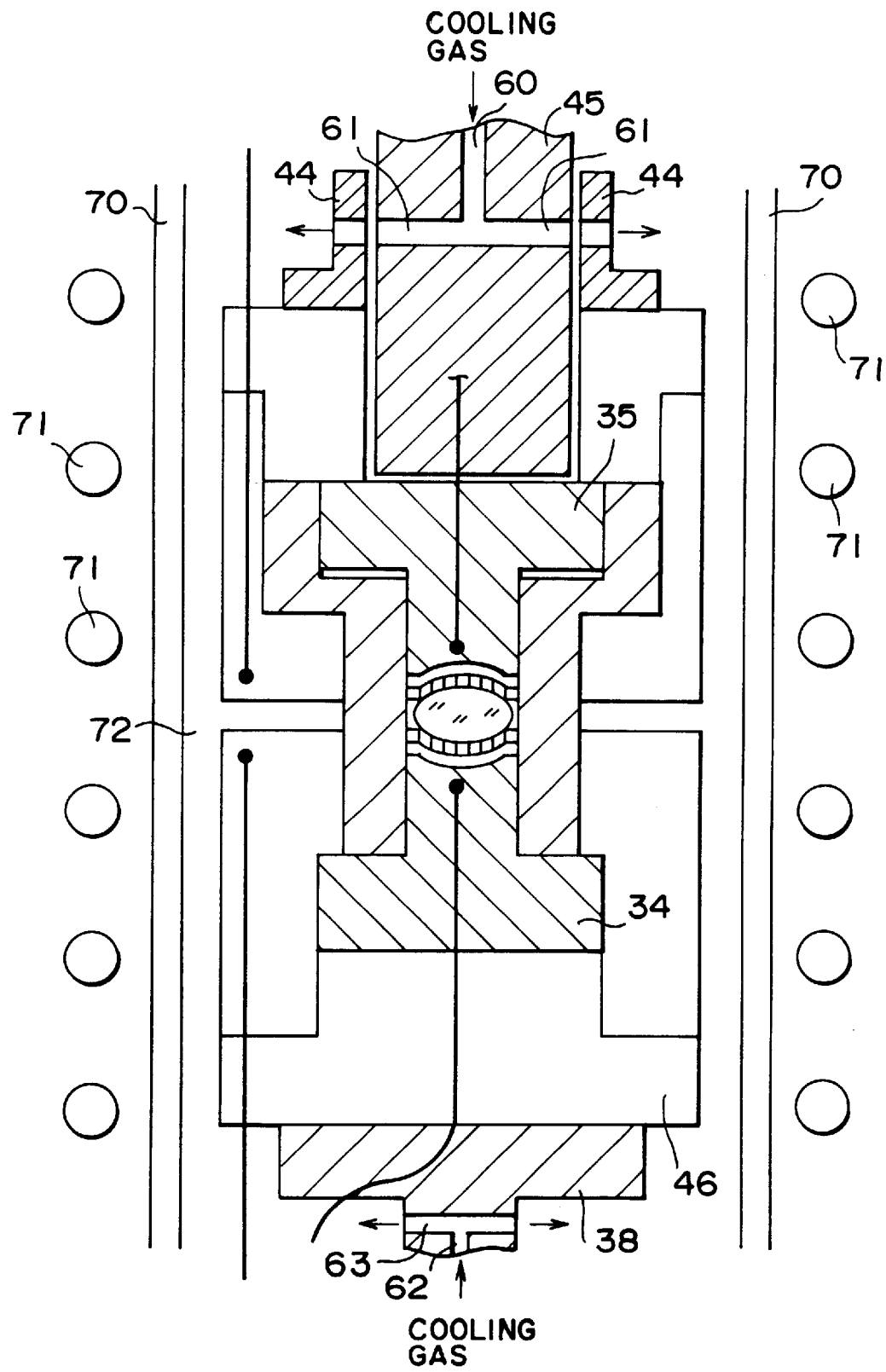
FIG. 9 is a schematic view for describing a press forming process carried out in a forming mold used in this invention.
Figure 10:
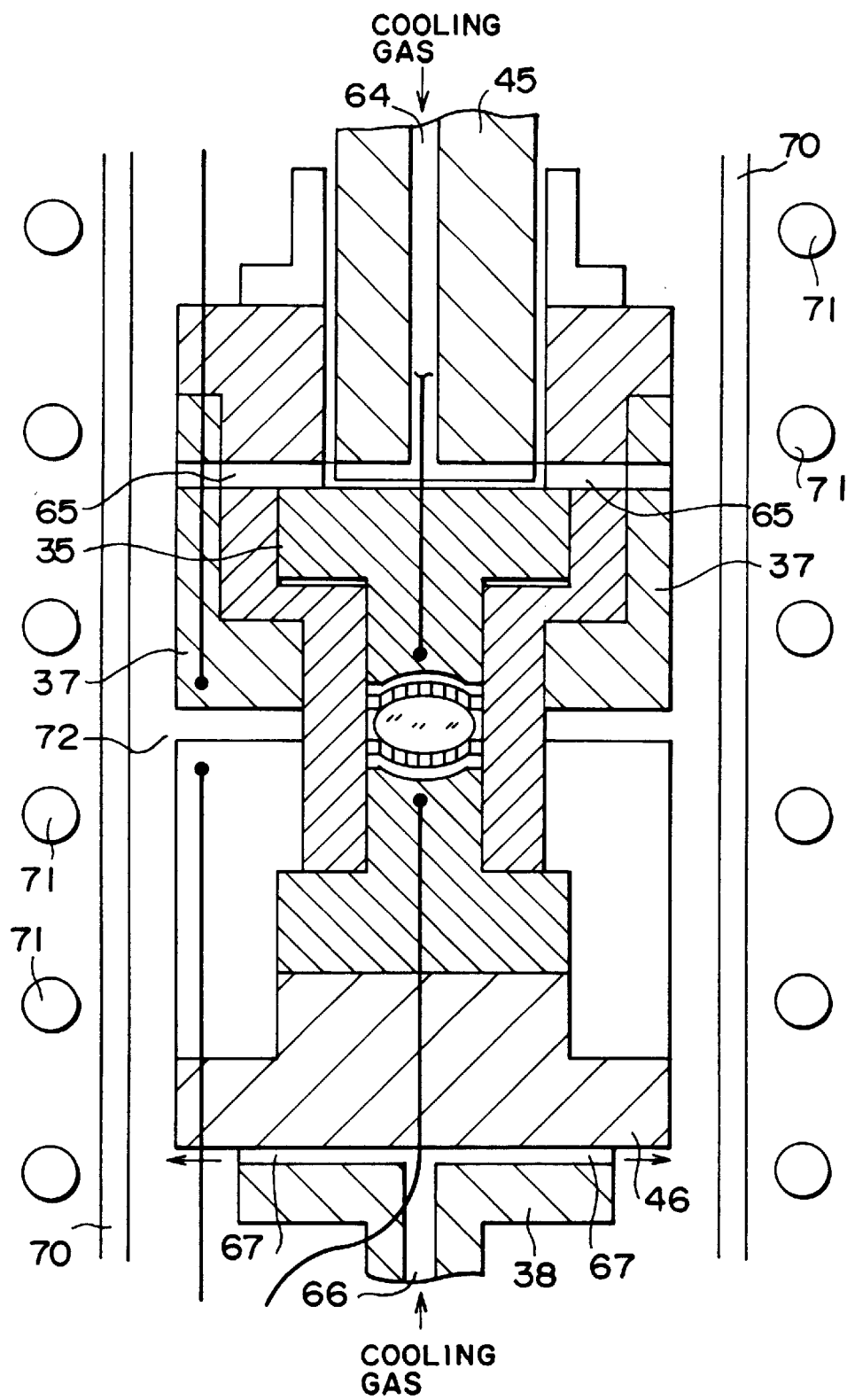
FIG. 10 is a schematic view for describing a press forming process carried out in a forming mold used in this invention.

The forming mold to be used in this invention is properly disposed in a quartz glass tube 70 which encloses a forming mold therewith as illustrated in FIG. 9 and FIG. 10 and allows the atmosphere of the whole forming chamber to be cooled. In the forming mold illustrated in FIG. 9 and FIG. 10, the cooling gas can be supplied into the forming chamber through the medium of a push rod 45 and a support base 38. The cooling gas can be supplied to the forming chamber without resorting to the push rod 45 or the support base 38.

The forming mold illustrated in FIG. 9 is provided with a cooling gas flow path 60 laid vertically inside the push rod 45 from the upper part thereof through the level falling halfway in the entire height of the push rod 45 and gas flow paths 61 laid radially (in four directions, 6 directions, or 8 directions, for example) at the level of the push rod 45 mentioned above from the gas flow path 60 as the center through the push rod 45 and a forming mold supporting member 44. The push rod 45 contacts the upper die 35 so that the upper die 35 can be cooled by the push rod 45 which is cooled with the cooling gas supplied to the gas flow paths 60 and 61. The forming mold is further provided with a cooling gas flow path 62 laid vertically in the forming mold supporting base 38 supporting the lower die 34 from the lower part thereof through the level falling halfway in the entire height of the supporting base 38 and gas flow paths 63 laid radially (in four directions, six directions, or eight directions, for example) at the level of the supporting base 38 mentioned above from the gas flow path 62 as the center through the forming mold supporting base 38. The forming mold supporting base 38 contacts the lower surface of a support base 46 for the lower die so that the lower die 34 can be cooled with the cooling gas supplied through the gas flow path 62 to the gas flow paths 63 through the medium of the support base 46.

The forming mold illustrated in FIG. 10 is provided with a cooling gas flow path 64 laid vertically in the push rod 45 from the upper part through the bottom part thereof and cutting grooves 65 formed radially (in four directions, six directions, or eight directions, for example) on the bottom part of the push rod 45 from the gas flow path 64 as the center through the forming mold supporting base 38 and an upper cylindrical frame 37. The cutting grooves 65 contact the upper surface of the upper die 35 so that the upper die 35 can be cooled with the cooling gas supplied through the gas flow path 64 to the cutting grooves 65. The forming mold is further provided with a cooling gas flow path 66 laid vertically in the forming mold supporting base 38 supporting the lower die 34 from the lower part through the bottom part of the support base 46 and cutting grooves 67 formed radially (in four directions, six directions, or eight directions, for example) on the bottom part of the support base 38 from the gas flow path 66 as the center through the forming mold supporting base 38. The cutting grooves 67 contact the lower surface of the support base 46 of the lower die so that the lower die 34 can be cooled with the cooling gas supplied through the gas flow path 66 to the cutting grooves 67.

The cooling gas discharged through the gas flow paths 61 and 63 and the cutting grooves 65 and 67 stagnates inside the quartz glass tube 70 enclosing the forming mold therewith and cools the whole forming mold from outside. The flow volume of the cooling gas, in the upward and the downward directions alike, can be set in the range of 5–80 liters/minute.

The material of which the upper and the lower dies of the forming mold illustrated in FIG. 9 or FIG. 10 are made is the same as described above.

In the method of formation in this invention, the thermal softening of the glass material can be carried out with the glass material kept suspended with a gaseous stream. The thermally softened glass material is transferred to the preheated forming mold mentioned above.

When the glass material has such low viscosity as deforms under the weight of its own, it is extremely difficult to prevent the glass material from being fused with the jig supporting the glass material during the course of heating. In contrast, by causing a gas to spout from the inside of the jig and enabling the glass material to be suspended by the stream of the gas and consequently interposing a layer of the gas between the surface of the jig and the surface of the glass material, the thermal softening of the glass material can be attained without inducing any reaction between the jig and the glass material. When the glass material happens to be a preform, the preform can be thermally softened without impairing the shape thereof. Even when the glass material is a glass gob having an irregular shape and sustaining such surface defects as wrinkles, the glass gob can be adjusted in shape and deprived of the surface defects by being thermally softened as suspended with the stream of the gas. No particular restriction is imposed on the gas which is destined to form the gaseous stream and used for suspending the glass material in this invention. From the viewpoint of preventing the heated jig from being deteriorated by oxidation, however, it is proper to adopt a nonoxidizing gas for the gas in question. Preferably, it is nitrogen, for example. Optionally, this gas may incorporate therein a reducing gas such as, for example, hydrogen gas.

The flow volume of the gaseous stream can be suitably varied in consideration of such factors as, for example, the shape of the spouting nozzle for the gaseous stream and the shape and weight of the glass material. Generally, for the purpose of the suspension of the glass material, the flow volume of the gas is properly in the range of 0.005–20 liters/minute. If the flow volume of gas is less than 0.005 liter/minute, the gaseous stream will possibly fail to suspend the glass material satisfactorily when the weight of the glass material exceeds 300 mg. If the flow volume exceeds 20 liters/minute, the glass material on the suspending jig will oscillate largely even when the weight of the glass material exceeds 2000 mg. When the glass material happens to be a preform, it will be deformed by the oscillation during the course of heating.

Figure 2:
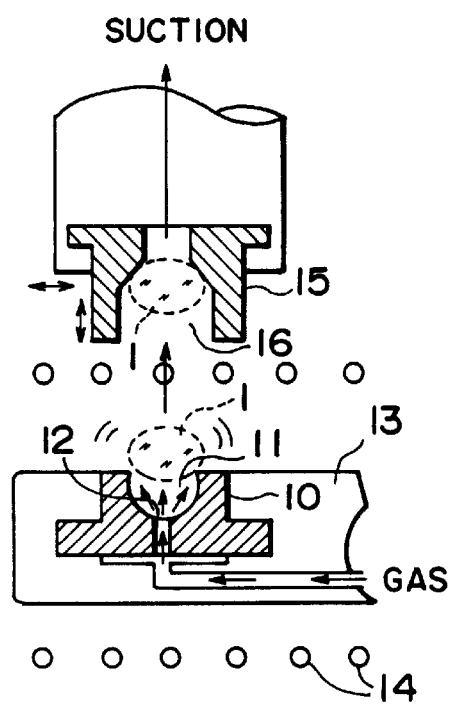
FIG. 2 is a schematic view for describing operation carried out by the use of a floating tool or jig used in this invention.
Figure 6:
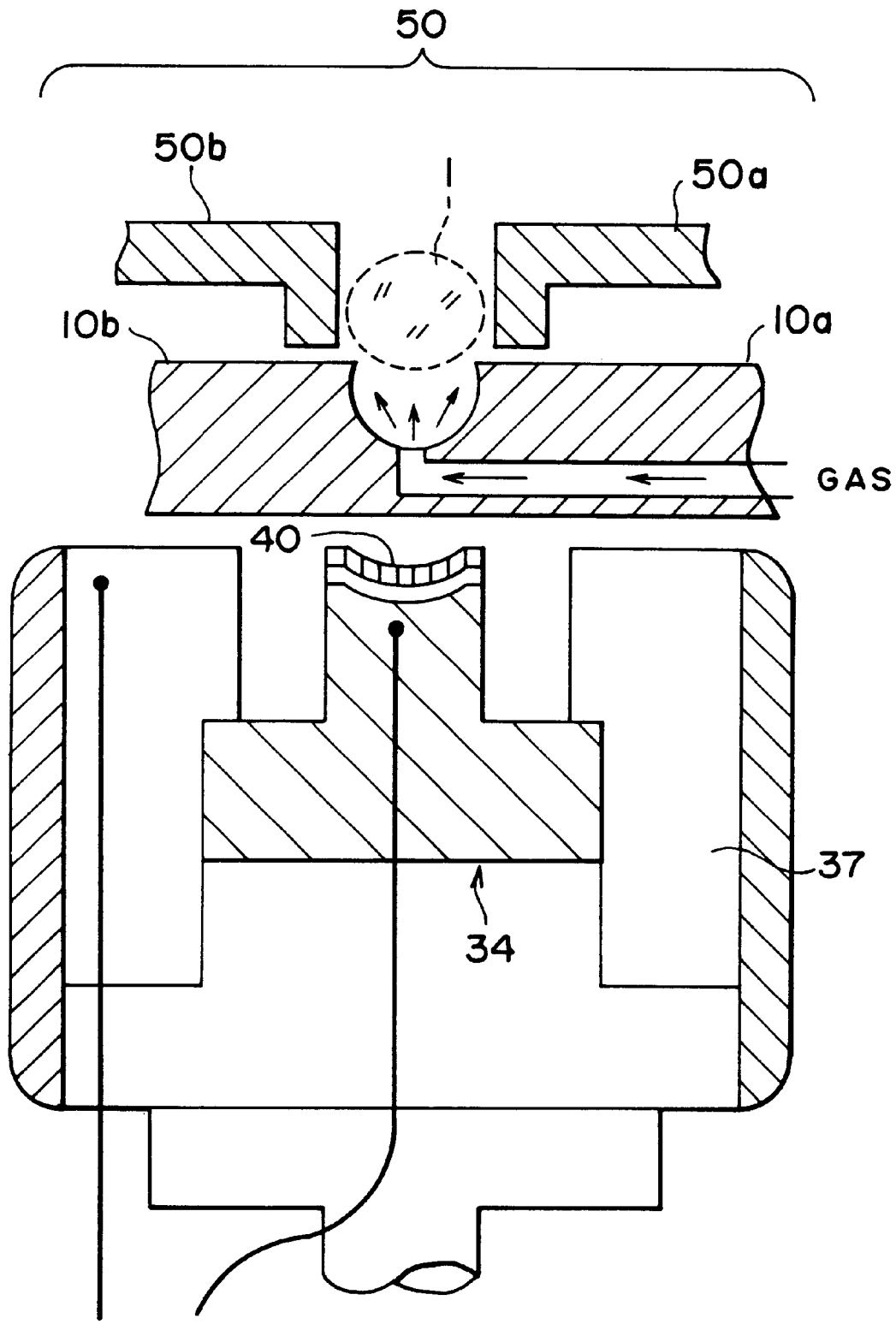
FIG. 6 is a schematic view for describing a process of transferring a softened glass preform to a forming mold.

The floatation of the glass material can be effected with the gaseous stream which is emanating upward through an opening part, for example. As illustrated in FIG. 2, an upper opening part 11 of a floating jig 10 supported by a floating jig supporting member 13 has a smaller diameter than a glass material 1 and the glass material 1 is suspended above the upper opening part 11 by the gaseous stream emanating upward from a bottom 12 of the upper opening part 11 of the floating jig 10 and kept from contacting the floating jig 10. The glass material 1 is heated by glass softening heaters 14 disposed peripherally. Optionally, the floating jib 10 may be so constructed as to be divided into two parts (10a and 10b) as illustrated in FIG. 6.

Figure 3:
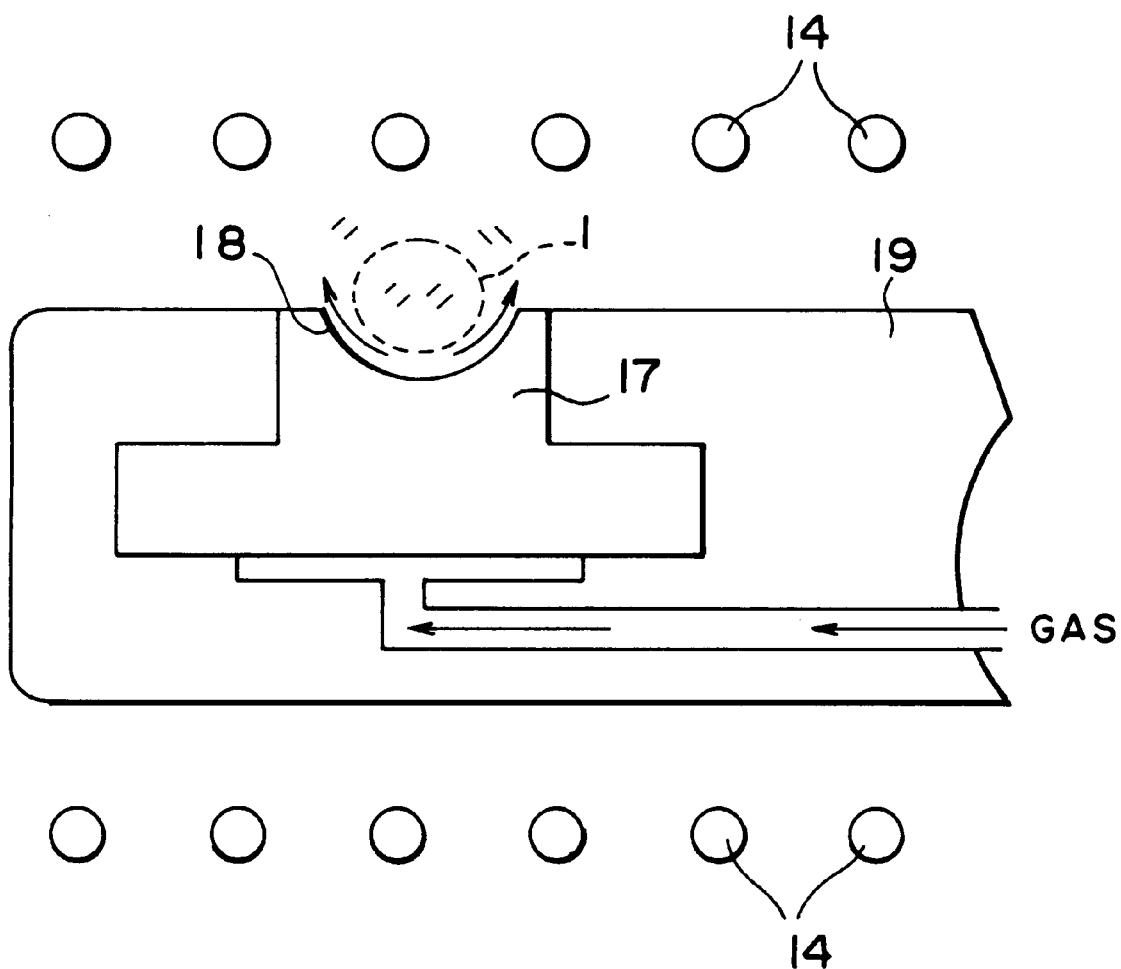
FIG. 3 is a schematic view for describing operation carried out by the use of the floating tool illustrated in FIG. 2 in detail.

Alternatively, the floatation of the glass material can be implemented with the gaseous stream which emanates from a porous surface having either a spherical shape of a radius of curvature approximating closely to the outside diameter of the glass material or a planar shape. This floatation is particularly effective when the glass material is a preform because the preform can very easily retain its shape intact during the course of the floatation. Further, when the glass material is a glass gob, the glass gob can be deprived of the surface defects thereof by heating the glass gob as suspended with the gaseous stream emanating from the porous surface. As illustrated in FIG. 3, for example, on a floating jig 17 supported by a floating jig supporting member 19 and possessed of a spherical porous surface 18 approximating in radius of curvature closely to the glass material 1, the glass material 1 can be retained as suspended with the gaseous stream emanating from the porous surface 18. The floating jig supporting member 14 and a floating jig 15 can be so constructed as to be divided in the same manner as illustrated in FIG. 6.

The heating of the glass material contemplated herein embraces the case of heating from normal room temperature to a prescribed temperature, the case of using a glass material heated in advance to a certain temperature and further heating this hot glass material, and the case of using a glass material already heated to a prescribed temperature. When the glass material is a glass gob, for example, the glass gob manufactured from molten glass may be used without being cooled to an unduly low temperature.

In this invention, the transfer of the thermally softened glass material to the preheated forming mold can be effected, for example, by having the glass material suspended by aspiration or allowing the softened glass material to fall down.

Figure 4:
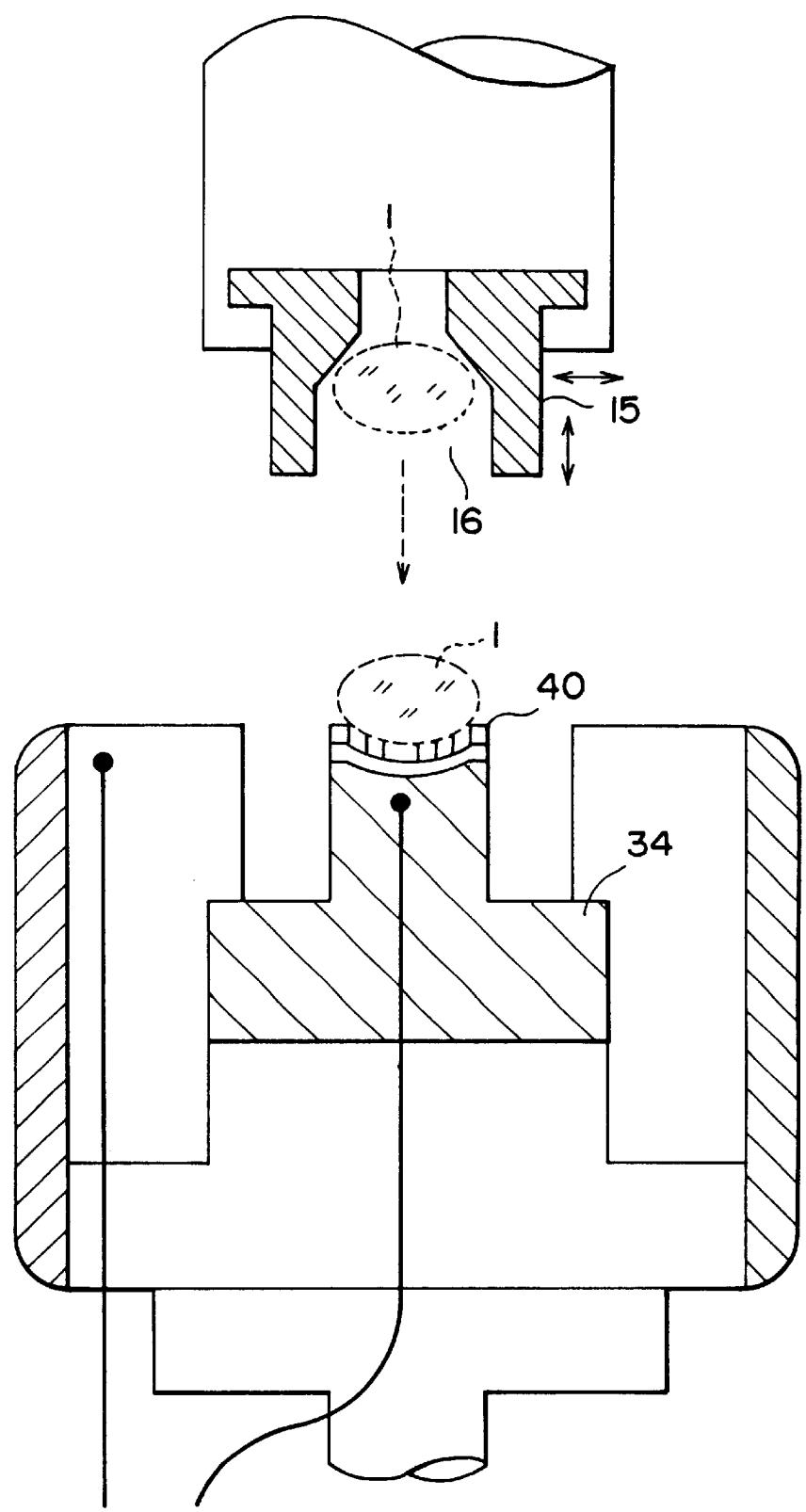
FIG. 4 is a schematic view for describing a process of transferring a softened glass preform to a forming mold.

The suspension of the glass material by aspiration can be attained, for example, by means of a mobile aspiration suspension device 15 which is possessed of a lower opening part 16 as illustrated in FIG. 2. The lower opening part 16 communicates with a decompression pump or a vacuum pump which is capable of inward aspiration. This lower opening part 16 can retain by aspiration the glass material. The glass material heated and softened is aspirated and retained by the lower opening part 16 of the mobile aspiration suspension device 15 and conveyed to the position above a foaming surface 40 of the lower die 34 of the forming mold as illustrated in FIG. 4. Then, a shaped article of glass 2 can be obtained by press forming the softened glass material 1 between the forming surface 40 of the lower die 34 and a foaming surface 41 of the upper die 35 as illustrated in FIG. 5.

Figure 7:
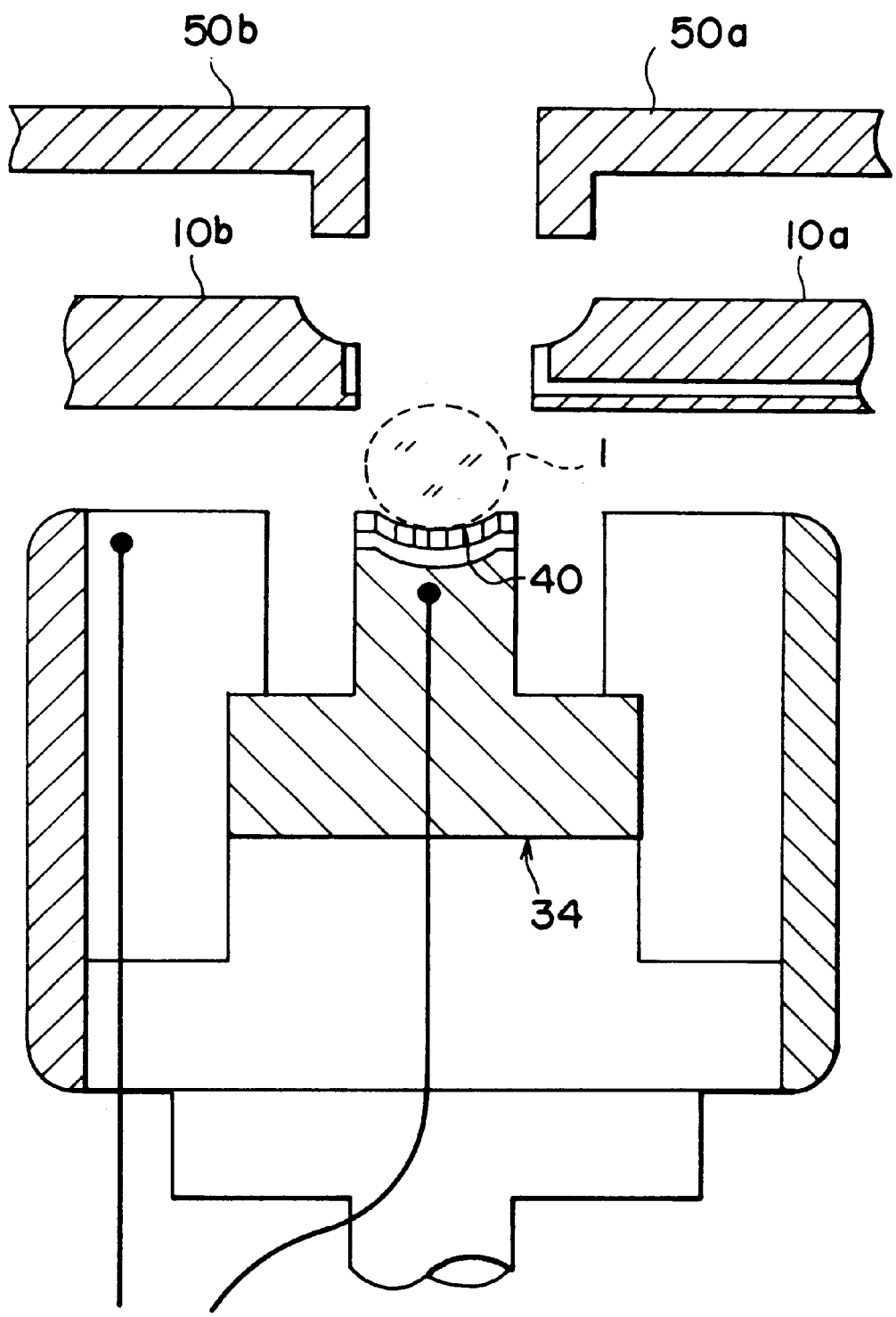
FIG. 7 is a schematic view for describing another process of transferring a softened glass preform to a forming mold.

The transfer of the thermally softened glass material can otherwise be attained by allowing the glass material to fall down. The fall of the glass material, for example, can be effected because the floating jig used for heating the glass material is divided into two or more parts and the lower part is moved downward to give rise to an opening available for the fall. Specifically, the glass material 1 falls because the floating jig 10, when the glass material 1 is heated on the floating jig 10 and then softened, is divided horizontally into two parts 10a and 10b as illustrated in FIG. 7 and the divided parts are moved in the opposite directions (left and right in the bearings of the diagram). In this case, by having the lower die 34 of the forming mold disposed as a receptacle for the falling glass material 1, the glass material 1 can be transferred onto the forming surface 40 of the lower die 34.

Further, this invention allows use of guide means for the purpose of enabling the thermally softened glass material to be dropped onto a prescribed forming surface. The fall of the glass material 1 to the center of the forming mold can be attained, for example, by disposing above the floating jig 10 cylindrical guide means (composed of two divisible parts 50a and 50b) having an inside diameter capable of retaining an appropriate clearance from the largest outside diameter of the glass material as illustrated in FIG. 6 and FIG. 7. This guide means is only required to be capable of preventing the glass material from the deviation liable to occur during the division of the floating jig and the movement of the divided part of the jig. In the other respect, the guide means has no particular restriction such as on the construction. It may be formed of a plurality of pipes laid out after the fashion of a lattice or of two or more opposed plates. The guide means can be so constructed that it may be divided into at least two parts and the divided parts moved away from each other in consideration of the operation of the press forming which is accomplished by moving the upper die onto the lower die carrying the glass material thereon and then pressing the upper die against the lower die across the glass material.

No particular restriction is imposed on the method for dividing the floating jig to be used for heating the glass material and then moving the divided parts away from each other. When the floating jig is moved horizontally as mentioned above, for example, this floating jig can be divided into three or four equal parts and the divided parts moved away in three directions (spaced angularly by the unit of 120 or four directions (spaced angularly by the unit of 90 so as to allow the fall of the glass material. By moving the thermally softened glass material by the fall as described above, the glass material can be quickly transferred into the forming mold.

By this invention, a method for the formation of a glass optical element is provided which produces the glass optical element by press forming a thermally softened glass material like a glass preform and which, therefore, permits stable production of even a thin lens of the thin thickness at the edge with a high shape transferring property and a perfect mold release property while allowing a notable cut in the cycle time necessary for press forming.

By this invention, a method for the formation of a glass optical element is provided which is capable of producing the glass optical element manifesting perfect stability during the operation of mold release, enjoying freedom from surface defects such as shrinkage cavity or deformed contour, possessing high surface accuracy, and acquiring a central wall thickness falling in the range of manufacturing tolerance.

Further in this invention, since the operation for press forming a thermally softened glass material like a glass preform by the use of a preheated forming mold uses means capable of cooling the forming mold while keeping the temperature difference between the upper and the lower dies thereof intact, the stability manifested during the operation of mold release can be augmented and the cycle time necessary for press forming can be shortened markedly.

Now, this invention will be described specifically below with reference to working examples.

EXAMPLES 1-1 to 1-5

Press Forming Mold

The substrate for a press forming mold was obtained by using a sintered silicon carbide (SiC) blank 31 as the substratal material, working the blank 21 by grinding in the shape of a press forming mold, further forming a silicon carbide film 32 on the forming surface side of the die precursor as illustrated in FIG. 1, and manufacturing by grinding for mirror finish the coated die precursor into a shape conforming to the shaped article of glass intended to be finally obtained. A lower die 34 possessed of a forming surface 40 and adapted for a double-convex lens, 18 mm in diameter (15 mm in diameter after centering), was obtained by depositing on the silicon carbide film 32 of the forming mold substrate an i-carbon (diamond-like carbon) film 88 in a thickness of 500 x̄ by the ion plating method.

An upper die 35 illustrated in FIG. 5 was obtained by following the procedure used for the production of the upper die 34 mentioned above. The upper die 35 and the lower die 34 were coaxially set as illustrated in FIG. 5. For the work of press forming, a forming mold 39 comprising the upper die 35 and the lower die 34 and a guide frame 39 for guiding these dies was prepared. The upper die 35 was further provided on the upper surface thereof with a push rod 45 for use in secondary pressing.

The lower die 34 and the upper die 35 were heated with a forming mold heater 44 attached to the periphery of a cylindrical frame 37, with the temperatures of the dies measured and controlled with a mold temperature measuring thermocouple 42 inserted into the lower die 34 through the lower part of a forming mold supporting base 38. The temperature of the cylindrical frame 37 was measured with a cylindrical frame temperature measuring thermocouple 43 inserted into the cylindrical frame 37.

Floating Jig and Conveying Means

A closed chamber (not shown) incorporating therein the forming mold heating mechanism mentioned above was provided therein with a floating jig and conveying means illustrated in FIG. 2.

First, a glass softening heater 14 for thermally softening a glass material (preform) 1 was installed. In this glass softening heater 14, a glassy carbon floating jig 10 (hereinafter referred to as "GC floating jig") which was set on a floating jig supporting base 13 was disposed. The glass material 1 was kept afloat by the spout of a 98% $N_2$ +2% $H_2$ gas (Examples 1-1 to 1-3) or a N2 gas (Examples 1-4 and 1-5) supplied at a varying flow volumes indicated in Table 1 from the interior of the floating jig supporting base 13 to the lower part of the GC floating jig 10.

Beside the glass softening heater 14, a glassy carbon vacuum pad 15 (hereinafter referred to as "GC vacuum pad") movable in the vertical and horizontal directions was disposed. Normally, the GC vacuum pad 15 was left standing above the GC floating jig 10.

Preheating and Pressing Step

The closed chamber (not shown) of a forming machine encasing the press forming mechanism and the glass heating mechanism mentioned above was evacuated and then caused to introduce the 98% $N_2$ +2% $H_2$ gas or the $N_2$ gas mentioned above until the closed chamber was filled with the atmosphere of the gas.

Now, a case of using a preform 1 of a barium borosilicate optical glass (a hot formed marble-shaped product, 1000 mg in weight, 534° C. in transition point, and 576° C. in yield point, sustaining no surface defect and possessing a mirror surface) will be described by way of example. The preform 1 was heated with the forming mold heater 44 until the temperatures of the upper die 35 and the lower die 34 (forming mold temperature) measured with the mold temperature measuring thermocouple 43 reached a temperature equivalent to the viscosity indicated in Table 1 and retained thereafter at the temperature mentioned above. The relation between the viscosity and temperature of glass was as follows

| Viscosity of glass | Temperature |
| --- | --- |
| $10^9$ poises | 614° C. |
| $10^{10}$ poises | 592° C. |
| $10^{11}$ poises | 572° C. |
| $10^{12}$ poises | 554° C. |
| $10^{12.7}$ poises | 543° C. |
| $10^{13.4}$ poises | 534° C. |
| $10^{14.5}$ poises | 518° C. |

The glass preform 9 on the GC floating jig 10 was heated with the glass softening heater 14 to a temperature equivalent to the viscosity shown in Table 1 and softened as kept afloat. The relation between the viscosity and temperature of the glass was as shown below.

| Viscosity of glass | Temperature |
| --- | --- |
| $10^{5.5}$ poises | 718° C. |
| $10^{6.4}$ poises | 686° C. |
| $10^{7.3}$ poises | 658° C. |
| $10^{8.2}$ poises | 634° C. |
| $10^{8.8}$ poises | 619° C. |

Then, the GC vacuum pad 15 kept standing over the floating jig 10 outside the glass softening heater 14 was lowered to the floating softened preform 1 and actuated to attract and hold fast thereto the preform 1 by aspiration. Though the GC vacuum pad had been heated to a temperature in the range of 300–400° C. by the heat radiated from the glass softening heater 14 by the time of the attraction of the preform 1 by aspiration, it induced no fusion of the glass thereto because the temperature was low.

Next, the GC vacuum pad 15 holding the preform 1 fast thereto as illustrated in FIG. 4 was quickly moved toward the upper side of the lower die 34 and, on descending to the proximity of the forming surface 40 of the lower die 34, stopped the aspirating motion and allowed the preform 1 to alight on the forming surface 40 of the lower die 34. Thereafter, no obstacle existed any longer over the lower die 34 because the GC vacuum pad 15 had retracted from above the lower die 34 returned to the home position. Consequently, the forming mold supporting base 38 instantaneously elevated the lower die 34 as far as the upper die 35 which was set fast together with the 36 forming mold supporting base 38 above coaxially with the lower die 34. In the forming mold 39 which was composed of the upper die 35, the lower die 34, and the guide frame 36 for guiding the dies as illustrated in FIG. 5, the preform 1 was press formed for 10 seconds under a pressure of 100 kg/cm² to acquire a wall thickness 30 µm larger than the wall thickness of the final product as measured where the flange part of the lower die 34 contacted the bottom surface of the guide frame 36. In the meanwhile, after 5 seconds following the start of application of pressure with the first cylinder, the shaped article of glass 2 and the forming mold 39 were continuously pressed with a pressure of 20 kg/cm² (1-1 to 1-5) against the rear surface of the upper die 35 by the push rod 45 which was connected to the second cylinder held inside the first cylinder. Then, the forming mold heater 44 was disconnected from the power source and the shaped article 2 and the forming mold 39 were left cooling. After the elapse of the time indicated as the forming time [initial pressing time (10 seconds)+secondary pressing time] in Table 1, the shaped article 2 of glass was released from the forming mold 39 and extracted when the temperatures of the upper die 35 and the lower die 34 measured by the mold temperature measuring thermocouple 42 reached the temperature indicated as the temperature at the time of mold release indicated in Table 1 and the shaped article 2 of glass acquired a prescribed wall thickness. The relation between the viscosity and temperature of the glass was as shown above.

The shaped article 2 of glass (a double-convex lens, 18 mm in outside diameter, 2.9 mm in wall thickness, and 1.0 mm in thickness at the edge) obtained as described above, after being annealed, was tested for surface accuracy by the use of an interferometer and for surface quality by visual observation and by the use of a stereomicroscope. The results are shown as 1-1 to 1-5 in Table 1. The evaluation was made on five lens samples obtained by one and the same method. (The same remarks hold good for the following examples.) All the lens samples were found to possess fine quality.

EXAMPLES 2-1 to 2-5

Press Forming Mold

Figure 8:
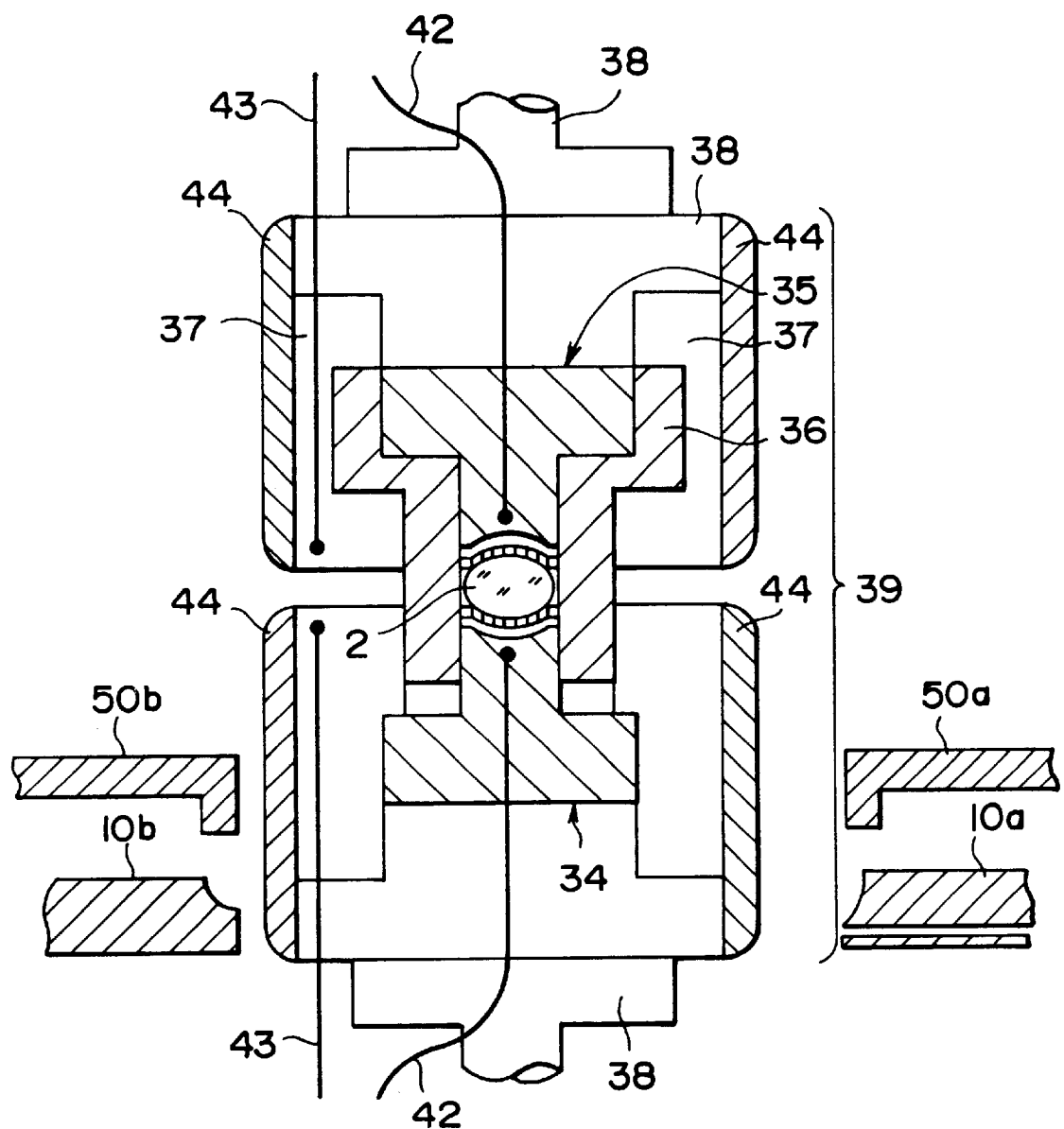
FIG. 8 is a schematic view for describing a process of press forming a glass material by a forming mold.

The press forming mold used herein was identical with that of Example illustrated in FIG. 8, excepting the push rod 45 was omitted.

Floating Jig

The same closed chamber (not shown) incorporating therein the forming mold heating mechanism mentioned above was provided therein with the floating jig 10 (10a, 10b) and the guide means 50 (50a, 50b) shown in FIG. 6 and the glass softening heater (not shown) for thermally softening the glass material. The floating jig 10 was a split floating jig which was made of glassy carbon (hereinafter referred to as "GC split floating jig) and the guide means 50 was a split cylindrical guide which was made of the same material (hereinafter referred to as "TGC split cylindrical guide"). The glass material 1 was kept afloat by the spout of the 98% $N_2$ +2% $H_2$ gas supplied at the flow volume indicated in Table 1 from the interior of the GC split floating jig.

Thermally Softening and Pressing Step

The closed chamber of a forming machine encasing the press forming mechanism and the glass heating mechanism mentioned above was evacuated and then caused to introduce the 98% $N_2$ +2% $H_2$ gas until the closed chamber was filled with the atmosphere of the gas.

Then, by the use of the forming mold heater 44 illustrated in FIG. 8, the upper die 35 and the lower die 34 were heated until the temperatures thereof measured with the mold temperature measuring thermocouple 43 reached 572° C. (Examples 2-1 to 2-3 and 2-5) equivalent to $10^{11}$ poises or 554° C. (Examples 2–4) equivalent to $10^{12}$ poises of the viscosity of the same glass material as in Example 1 and then retained at the temperature mentioned above. In this case, the upper die and the lower die were severally heated at different places and, prior to the forming operation, assembled into one integral die as illustrated in FIG. 8.

Meanwhile, the glass material 1 on the GC split floating jig 10 was heated by the use of the glass softening heater until the temperature thereof reached 718° C., a temperature equivalent to $10^{5.5}$ poises of the viscosity of glass as shown in Table 1, and then retained at the temperature mentioned above.

Next, the GC split floating jig 10 having the thermally softened glass material 1 kept afloat thereon was quickly moved to directly above the lower die 34 and, subsequently, the GC split floating jig 10a and the GC split floating jib 10b were instantaneously moved respectively to the left and right in the horizontal direction to give rise to an opening, with the result that the glass material 1 was dropped and allowed to alight on the forming surface 40 of the lower die 34. At this time, directly above the GC split floating jig 10, a GC split cylindrical guide 50 having an inside diameter allowing a proper clearance relative to the largest outside diameter of the glass material 1 was disposed. When the GC split floating jib 10 was opened and the glass material 1 was consequently dropped, the GC split cylindrical guide 50 fulfilled the role of a guide capable of minimizing the amount of setting deviation between the glass material 1 and the lower die 34.

After the fall of the glass material, the GC split cylindrical guides 50a and 50b were moved respectively to the left and the right in the horizontal direction to give rise to an opening. Since no obstacle existed any longer above the lower die 34, the forming mold supporting base 38 instantaneously elevated the lower die 34 as far as the upper die 35 which was set fast together with the forming mold supporting base 38 above coaxially with the lower die 34. In the forming mold which was composed of the upper die 35, the lower die 34, and the guiding frame 36 for guiding the two dies as illustrated in FIG. 8, the glass material 1 was press formed for 10 seconds under a pressure of 100 kg/cm$^2$ until it acquired a prescribed wall thickness. Then, the pressure in the forming mold was abruptly decreased to 50 kg/cm$^2$ and, at the same time, the forming mold heater 14 was disconnected from the power source and the shaped article 2 of glass and the forming mold retained under the decreased pressure were consequently left cooling. After the elapse of the time indicated as the forming time [initial pressing time (10 seconds)+secondary pressing time] in Table 1, the shaped article 2 of glass was released from the forming mold and extracted when the temperatures of the upper die 35 and the lower die 34 measured by the mold temperature measuring thermocouple 43 reached the level equivalent to the viscosity indicated as the temperature at the time of mold release indicated in Table 1.

The shaped article 2 of glass (a double-convex lens, 18 mm in outside diameter, 2.9 mm in wall thickness, and 1.0 mm in thickness at the edge) obtained as described above, after being annealed, was tested for surface accuracy by the use of an interferometer and for surface quality by visual observation and by the use of a stereomicroscope. The results are shown in Table 1. The evaluation was made on five lens samples obtained by one and the same method.

procedure of Example 1-1 while changing the time of initial pressing to 5 seconds (Example 3-1) or to 30 seconds (Example 3-2). The shaped articles of glass, after being annealed, were tested for surface accuracy by the use of an interferometer and for surface quality by visual observation and by the use of a stereomicroscope. The results are shown in Table 2.

EXAMPLES 4-1 to 4-2

Shaped articles of glass (double-convex lenses, 18 mm in outside diameter, 2.9 mm in wall thickness, and 1.0 mm in thickness at the edge) were obtained by following the procedure of Example 1-1 while the spontaneous cooling of the forming mold 39 was started simultaneously with the initial pressing (under a pressure of 100 kg/cm$^2$) (Example 4-1) or 5 seconds after the start of the initial pressing (Example 4-2). The shaped articles of glass, after being annealed, were tested for surface accuracy by the use of an interferometer and for surface quality by visual observation and by the use of a stereomicroscope. The results are shown in Table 2.

In Table 2, evaluation has been made like in Table 1 so as to determine surface irregularities, namely, surface accuracy of the shaped articles of glass by the use of the Newton-ring method which measures astigmatism specified by Newton rings on the surfaces. In Tables 1 and 2, the single circle ○

TABLE 1

| Example | Glass Temperature (° C.) (Corresponding Viscosity: poises (P)) | Floating Flow Volume (lit/min) | Mold Temperature (° C.) at the Beginning of Molding (Corresponding Viscosity: poises (P)) | | Forming Pressure (kg/cm$^2$) | | Forming Time (sec) | Cooling Speed (° C./min) | Mold Temperature (° C.) at the Time of Mold Release (Corresponding Viscosity: poises (P)) | | Evaluation of Shaped Article of Glass | |
|---|---|---|---|---|---|---|---|---|---|---|---|---|
| | | | Upper Die | Lower Die | 1st Pressing | 2nd Pressing | | | Upper Die | Lower Die | Surface Accuracy | Surface Quality |
| 1-1 | 686° C. ($10^{6.4}$ P) | 0.5 | 562° C. ($10^{11.6}$ P) | 592° C. ($10^{10}$ P) | 100 | 20 | 85 | 47 | 504° C. ($10^{15.3}$ P) | 534° C. ($10^{13.4}$ P) | ◉ | ◉ |
| 1-2 | 686° C. ($10^{6.4}$ P) | 0.5 | 562° C. ($10^{11.6}$ P) | 572° C. ($10^{11}$ P) | 100 | 20 | 70 | 26 | 536° C. ($10^{13.3}$ P) | 546° C. ($10^{12.5}$ P) | ◉ | ◉ |
| 1-3 | 658° C. ($10^{7.3}$ P) | 1.0 | 594° C. ($10^{9.9}$ P) | 614° C. ($10^{9}$ P) | 100 | 20 | 85 | 65 | 514° C. ($10^{14.7}$ P) | 534° C. ($10^{13.4}$ P) | ◉ | ◉ |
| 1-4 | 658° C. ($10^{7.3}$ P) | 1.0 | 577° C. ($10^{10.7}$ P) | 592° C. ($10^{10}$ P) | 100 | 20 | 65 | 57 | 515° C. ($10^{14.7}$ P) | 540° C. ($10^{12.9}$ P) | ○ | ◉ |
| 1-5 | 620° C. ($10^{8.8}$ P) | 1.0 | 600° C. ($10^{9.6}$ P) | 610° C. ($10^{9.2}$ P) | 100 | 20 | 90 | 64 | 515° C. ($10^{14.7}$ P) | 525° C. ($10^{14.1}$ P) | ◉ | ◉ |
| 2-1 | 718° C. ($10^{5.5}$ P) | 0.5 | 554° C. ($10^{12}$ P) | 572° C. ($10^{11}$ P) | 100 | 50 | 70 | 29 | 525° C. ($10^{14.1}$ P) | 543° C. ($10^{12.7}$ P) | ◉ | ◉ |
| 2-2 | 718° C. ($10^{5.5}$ P) | 0.5 | 567° C. ($10^{11.3}$ P) | 572° C. ($10^{11}$ P) | 100 | 50 | 70 | 43 | 524° C. ($10^{14.1}$ P) | 529° C. ($10^{13.7}$ P) | ◉ | ◉ |
| 2-3 | 718° C. ($10^{5.5}$ P) | 0.5 | 572° C. ($10^{11}$ P) | 602° C. ($10^{9.5}$ P) | 100 | 50 | 85 | 45 | 516° C. ($10^{14.7}$ P) | 546° C. ($10^{12.5}$ P) | ○ | ◉ |
| 2-4 | 718° C. ($10^{5.5}$ P) | 0.5 | 554° C. ($10^{12}$ P) | 564° C. ($10^{11.4}$ P) | 100 | 50 | 70 | 21 | 534° C. ($10^{13.4}$ P) | 544° C. ($10^{12.6}$ P) | ◉ | ◉ |
| 2-5 | 718° C. ($10^{5.5}$ P) | 0.5 | 562° C. ($10^{11.6}$ P) | 572° C. ($10^{11}$ P) | 100 | 20 | 82 | 45 | 508° C. ($10^{15.1}$ P) | 518° C. ($10^{14.5}$ P) | ◉ | ◉ |

Table 1 shows the results of the evaluation performed on shaped articles of glass obtained by varying the temperature of the softened glass material 1, the shape of the glass material, the flow volume of the gas emanating from the GC split floating jig, the temperature of the forming mold, and the temperature of mold release. All the shaped articles (lenses) were found to possess fine quality.

EXAMPLES 3-1 to 3-2

Shaped articles of glass (double-convex lenses, 18 mm in outside diameter, 2.9 mm in wall thickness, and 1.0 mm in thickness at the edge) were obtained by following the represents the astigmatism which is not more than 0.5 piece while the double circle ◉ represents the astigmatism which is not more than 0.2 piece. In the column of the surface quality, the double circle ◉ represents an excellent surface.

The "cycle time" shown in Example 1-4 above was the sum of the forming time and the time for restoration of the mold temperature (the time required for the temperature at the time of mold release to rise to the temperature at the time of starting the molding). In this example, the time for restoration mentioned above was about 35 seconds because resistance heating was adopted for heating the forming mold. The cycle time, therefore, was in the approximate range of 85 to 165 seconds.

By adopting high frequency heating or infrared heating for the purpose of heating the forming mold, the time of restoration mentioned above could be decreased to about 10 seconds. Thus, the cycle time could be decreased proportionately.

EXAMPLES 5-1 to 5-3

Shaped articles of glass (double-convex lenses, 18 mm in outside diameter, 2.9 mm in wall thickness, and 1.0 mm in thickness at the edge) were obtained by following the procedure of Example 1-1 while using a press forming mold constructed as illustrated in FIG. 9 instead, heating the forming mold with a high frequency heating coil 71 disposed outside a quartz glass tube 70 provided outside the forming mold, causing a thermally softened glass preform to fall onto the lower die and simultaneously enabling the lower die to rise and press the interior of a the forming chamber 72 and, subsequently to the pressing, supplying a cooling gas vertically downward and upward at a flow rate of 20 liters/minute into the forming chamber to effect forced cooling the whole forming chamber encasing the forming mold and the quartz glass tube. The shaped articles of glass, after being annealed, were tested for surface accuracy by the use of an interferometer and for surface quality by visual observation and by the use of a stereomicroscope. The results are shown in Table 3.

EXAMPLES 6-1 to 6-3

Shaped articles of glass (double-convex lenses, 18 mm in outside diameter, 2.9 mm in wall thickness, and 1.0 mm in thickness at the edge) were obtained by following the procedure of Example 5 while using a press forming mold constructed as illustrated in FIG. 10 instead. The shaped articles of glass, after being annealed, were tested for surface accuracy by the use of an interferometer and for surface quality by visual observation and by the use of a stereomicroscope. The results are shown in Table 3.

What is claimed is:

1. A method of precisely manufacturing a glass optical element as a shaped article of glass by press forming a glass material within a mold separable into an tipper and a lower die both of which are opposed to each other with a hollow space left therebetween and which have forming surfaces mirror finished, the method comprising:

(a) heating the glass material to a predetermined temperature which corresponds to a viscosity range between $10^{5.5}$ and $10^{7.6}$ poises;

TABLE 2

| Example | Glass Temperature (° C.) (Corresponding Viscosity: poises (P)) | Floating Flow Volume (lit/min) | Mold Temperature (° C.) at the Beginning of Molding (Corresponding Viscosity: poises (P)) | | Forming Pressure (kg/cm²) | | Forming Time (sec) | Cooling Speed (° C./min) | Mold Temperature (° C.) at the Time of Mold Release (Corresponding Viscosity: poises (P)) | | Evaluation of Shaped Article of Glass | |
|---|---|---|---|---|---|---|---|---|---|---|---|---|
| | | | Upper Die | Lower Die | 1st Pressing | 2nd Pressing | | | Upper Die | Lower Die | Surface Accuracy | Surface Quality |
| 3-1 | 686° C. ($10^{6.4}$ P) | 0.5 | 587° C. ($10^{10.2}$ P) | 592° C. ($10^{10}$ P)) | 100 | 20 | 80 | 47 | 529° C. ($10^{13.8}$ P) | 534° C. ($10^{13.4}$ P) | ◎ | ◎ |
| 3-2 | 686° C. ($10^{6.4}$ P) | 0.5 | 582° C. ($10^{10.5}$ P) | 592° C. ($10^{10}$ P) | 100 | 20 | 105 | 47 | 524° C. ($10^{14.1}$ P) | 534° C. ($10^{13.4}$ P) | ◎ | ◎ |
| 4-1 | 686° C. ($10^{6.4}$ P) | 0.5 | 572° C. ($10^{11}$ P) | 592° C. ($10^{10}$ P) | 100 | 20 | 75 | 47 | 514° C. ($10^{14.7}$ P) | 534° C. ($10^{13.4}$ P) | ◎ | ◎ |
| 4-2 | 686° C. ($10^{6.4}$ P) | 0.5 | 567° C. ($10^{11.3}$ P) | 592° C. ($10^{10}$ P) | 100 | 20 | 80 | 47 | 509° C. ($10^{15.0}$ P) | 534° C. ($10^{13.4}$ P) | ◎ | ◎ |

TABLE 3

| Example | Glass Temperature (° C.) (Corresponding Viscosity: poises (P)) | Mold Temperature (° C.) at the Beginning of Molding (Corresponding Viscosity: poises (P)) | | Forming Pressure (kg/cm²) | | Forming Time (sec) | Cooling Speed (° C./min) | Mold Temperature (° C.) at the Time of Mold Release (Corresponding Viscosity: poises (P)) | | Evaluation of Shaped Article of Glass | |
|---|---|---|---|---|---|---|---|---|---|---|---|
| | | Upper Die | Lower Die | 1st Pressing | 2nd Pressing | | | Upper Die | Lower Die | Surface Accuracy | Surface Quality |
| 5-1 | 686° C. ($10^{6.4}$ P) | 599° C. ($10^{9.7}$ P) | 614° C. ($10^{9}$ P) | 100 | 20 | 45 | 108 | 519° C. ($10^{14.4}$ P) | 534° C. ($10^{13.4}$ P) | ◎ | ◎ |
| 5-2 | 686° C. ($10^{6.4}$ P) | 577° C. ($10^{10.7}$ P) | 592° C. ($10^{10}$ P) | 100 | 20 | 40 | 89 | 519° C. ($10^{14.4}$ P) | 534° C. ($10^{13.4}$ P) | ◎ | ◎ |
| 5-3 | 686° C. ($10^{6.4}$ P) | 557° C. ($10^{11.8}$ P) | 572° C. ($10^{11}$ P) | 100 | 20 | 35 | 93 | 503° C. ($10^{15.3}$ P) | 518° C. ($10^{14.5}$ P) | ◎ | ◎ |
| 6-1 | 658° C. ($10^{7.3}$ P) | 577° C. ($10^{10.7}$ P) | 592° C. ($10^{10}$ P) | 100 | 20 | 35 | 108 | 514° C. ($10^{14.7}$ P) | 529° C. ($10^{13.7}$ P) | ◎ | ◎ |
| 6-2 | 658° C. ($10^{7.3}$ P) | 557° C. ($10^{11.8}$ P) | 572° C. ($10^{11}$ P) | 100 | 20 | 25 | 113 | 510° C. ($10^{14.9}$ P) | 525° C. ($10^{14.0}$ P) | ◎ | ◎ |
| 6-3 | 620° C. ($10^{8.8}$ P) | 587° C. ($10^{10.2}$ P) | 602° C. ($10^{9.5}$ P) | 200 | 40 | 65 | 103 | 510° C. ($10^{14.9}$ P) | 525° C. ($10^{14.0}$ P) | ◎ | ◎ |

(b) introducing the glass material at the predetermined temperature into the hollow space formed by the upper and the lower dies preheated to first and second temperatures which are lower than the predetermined temperature, respectively, and which corresponds to viscosity not lower than $10^9$ poises, the first temperature being lower than the second temperature;

(c) starting to press form the glass material at a viscosity less than $10^9$ poises within the upper and the lower dies kept at the first and the second temperatures different from each other, and forcibly cooling the upper and the lower dies simultaneously with the start of the press forming or during the press forming so as to cause a difference of adhesion to occur between the glass material and each of the upper and the lower dies; and (d) releasing the mold to take out the glass optical element with the upper and the lower dies kept at temperatures different from each other.

2. A method as claimed in claim 1, wherein the step (b) comprises the steps of:

floating the glass material over a blowing gas flow to provide a softened glass material; and introducing the softened glass material into the preheated mold.

3. A method as claimed in claim 2, wherein the glass material introducing step comprises:

dropping the softened glass material into the mold.

4. A method as claimed in claim 1, wherein the forcible cooling is carried out at a speed of 20 to 180° C./minute.

5. A method as claimed in claim 1, wherein the forcible cooling is carried out by causing a gas to flow through a gas passage formed in one or more of the upper die, the lower die, a member contacted with the upper die and a member contacted with the lower die.

6. A method as claimed in claim 1, the glass optical element having a final central thickness, wherein the initially pressing step is finished when a central thickness of the glass material during processing falls within a range which is 0.03 mm smaller than the final central thickness of the glass optical element and which is 0.15 mm greater than the final central thickness of the glass optical element;

the initially pressing step being followed by the subsequent pressing step based on the second pressure.

7. A method as claimed in claim 1, wherein the press forming step (c) comprises the step of:

keeping a temperature difference between the upper and the lower dies at a temperature range between 5 and 35° C. at the start of the press forming step.

8. A method as claimed in claim 1, wherein the releasing step (d) is carried out when the temperature adjacent to the forming surfaces of the mold is reduced to the temperature which corresponds to a viscosity range between $10^{13}$ and $10^{15.5}$ poises in the viscosity of the glass material.

9. A method as claimed in claim 2 wherein the step of starting forcible cooling of the upper and/or the lower dies also may occur at a time after the press forming step (c).

10. A method as claimed in claim 9, wherein the forcible cooling is carried out at a speed of 20 to 180° C./minute.

11. A method as claimed in claim 9, wherein the glass material is introduced into the mold in the form of a preform at the introducing step (b).

12. A method as claimed in claim 11, wherein the press forming step (c) comprises the steps of:

initially pressing the glass material under a first pressure; and subsequently carrying out secondary pressing under a second pressure which falls within a range between 5 and 70% of the first pressure.

13. A method as claimed in claim 1, wherein the glass material is formed by a glass gob, the glass gob being preheated by floating the glass gob over a blowing gas flow to remove surface defects of the glass gob.

14. A method as claimed in claim 2, wherein the glass material is formed by a glass gob, the glass gob being preheated by floating the glass gob over a blowing gas flow to remove surface defects of the glass gob.

15. A method as claimed in claim 1, wherein at least one of the forming surfaces of the upper and the lower dies is formed by a curved surface.

16. A method as claimed in claim 1, wherein the glass optical element is a glass lens.

* * * * *